United States Patent
Clissold et al.

(10) Patent No.: US 10,248,406 B2
(45) Date of Patent: *Apr. 2, 2019

(54) LOCALE OBJECT MANAGEMENT

(71) Applicant: International Business Machines Corporation, Armonk, NY (US)

(72) Inventors: David N. Clissold, Austin, TX (US); Denise M. Genty, Austin, TX (US); Su Liu, Austin, TX (US); Jun Su, Beijing (CN)

(73) Assignee: International Business Machines Corporation, Armonk, NY (US)

(*) Notice: Subject to any disclaimer, the term of this patent is extended or adjusted under 35 U.S.C. 154(b) by 188 days.

This patent is subject to a terminal disclaimer.

(21) Appl. No.: 15/354,330

(22) Filed: Nov. 17, 2016

(65) Prior Publication Data

US 2018/0136922 A1 May 17, 2018

(51) Int. Cl.
*G06F 9/46* (2006.01)
*G06F 8/65* (2018.01)
*G06F 9/48* (2006.01)
*G06F 9/451* (2018.01)

(52) U.S. Cl.
CPC ............... *G06F 8/65* (2013.01); *G06F 9/454* (2018.02); *G06F 9/461* (2013.01); *G06F 9/4812* (2013.01)

(58) Field of Classification Search
CPC ...... G06F 9/454; G06F 17/289; G06F 17/275; G06F 17/30669; G06F 3/0237; G06F 3/0481
See application file for complete search history.

(56) References Cited

U.S. PATENT DOCUMENTS

| | | |
|---|---|---|
| 6,111,572 A | 8/2000 | Blair et al. |
| 6,141,005 A | 10/2000 | Hetherington et al. |
| 6,262,725 B1 | 7/2001 | Hetherington et al. |
| 6,275,790 B1 | 8/2001 | Yamamoto et al. |
| 6,275,810 B1 | 8/2001 | Hetherington et al. |
| 6,295,050 B1 | 9/2001 | Kumhyr |
| 6,311,151 B1 | 10/2001 | Yamamoto et al. |
| 6,334,101 B1 | 12/2001 | Hetherington et al. |
| 6,339,755 B1 | 1/2002 | Hetherington et al. |
| 6,388,686 B1 | 5/2002 | Hetherington et al. |
| 6,389,386 B1 | 5/2002 | Hetherington et al. |
| 6,396,515 B1 | 5/2002 | Hetherington et al. |
| 6,407,754 B1 | 6/2002 | Hetherington et al. |
| 6,408,304 B1 | 6/2002 | Kumhyr |
| 6,411,948 B1 | 6/2002 | Hetherington et al. |

(Continued)

OTHER PUBLICATIONS

Kumhyr, Developing an International Calendar in Java, TME10 Internationalization Team, 13th International Unicode Conference, San Jose, CA, Sep. 1998, pp. 1-26.

*Primary Examiner* — Dong U Kim
(74) *Attorney, Agent, or Firm* — Lieberman & Brandsdorfer, LLC

(57) ABSTRACT

The present embodiments relate to context-switch based locale object management. More specifically, the embodiments relate to real-time re-loading of a locale object. A task is performed and monitored by a local object management daemon. If the task needs to be globalized, a pre-emptive locale object switch operation interrupts the application performing the task and reloads the application with a different locale object. The application is then resumed and operated with the re-loaded locale object.

13 Claims, 6 Drawing Sheets

(56) References Cited

U.S. PATENT DOCUMENTS

| | | |
|---|---|---|
| 6,421,680 B1 | 7/2002 | Kumhyr et al. |
| 6,460,015 B1 | 10/2002 | Hetherington et al. |
| 6,469,713 B2 | 10/2002 | Hetherington et al. |
| 6,493,735 B1 | 12/2002 | Kumhyr |
| 6,496,844 B1 | 12/2002 | Hetherington et al. |
| 6,567,973 B1 | 5/2003 | Yamamoto et al. |
| 8,244,712 B2 | 8/2012 | Serlet et al. |
| 8,769,404 B2 | 7/2014 | Atkin et al. |
| 8,843,360 B1 | 9/2014 | Johnston et al. |
| 9,141,352 B2 | 9/2015 | Bromley, Jr. et al. |
| 9,262,245 B2 | 2/2016 | Coker et al. |
| 9,285,870 B2 | 3/2016 | Liu et al. |
| 2002/0144105 A1* | 10/2002 | Real ................. G06F 9/454 713/2 |
| 2006/0210026 A1* | 9/2006 | Duplessis ........... G06F 9/454 379/88.05 |
| 2010/0107114 A1 | 4/2010 | Zachcial |
| 2010/0190479 A1* | 7/2010 | Scott ................. G06F 17/289 455/414.1 |
| 2012/0011551 A1* | 1/2012 | Levy ................. H04N 7/106 725/82 |
| 2012/0271828 A1* | 10/2012 | Raghunath ...... G06F 17/30669 707/739 |
| 2013/0013286 A1* | 1/2013 | Rodet ............... G06F 9/454 704/3 |
| 2013/0085927 A1* | 4/2013 | Scott ................. G06Q 20/32 705/39 |
| 2013/0253911 A1 | 9/2013 | Petri et al. |
| 2013/0326348 A1* | 12/2013 | Ip ..................... G06F 17/214 715/269 |
| 2014/0359472 A1* | 12/2014 | Lefor ................ G06F 3/0481 715/746 |
| 2015/0234807 A1* | 8/2015 | Phillips ............. G06F 17/275 704/9 |
| 2016/0277868 A1* | 9/2016 | Niles ................. H04W 4/50 |

* cited by examiner

LOCALE OBJECT MANAGEMENT

BACKGROUND

The present embodiments relate to context-switch based locale object management. More specifically, the embodiments relate to real-time reloading of a locale object.

When a context switch is invoked, a process is initiated to change from one executing task (process or thread) to another task. At such time as changing task execution takes place, an active and non-completed task is placed on hold while another task is placed in an active state for execution. The context switch stores the state of the task place on hold. At such time as the process returns to the task on hold, the state of the task is restored so that execution can be resumed from the stored point. Any time such a switch takes place there is the possibility of a conflict between or among tasks.

An application that can present information according to one or more regional cultural conventions is said to be globalized. More specifically, such a globalized application can be configured to accommodate different localities and language with different cultural protocols. Date and time formats, may also be appropriately supposed in the globalized application. Globalization consists of enabling an application component for multicultural support and translating and implementing a specific regional convention.

SUMMARY

A system and computer program product are provided for context-switch based locale object management. More specifically, the embodiments relate to real-time reloading of a locale object.

In one aspect, a system is provided with a processing unit in communication with a memory, and a functional unit in communication with the processing unit. The functional unit has a locale object management daemon to perform context-switch based locale object management. The locale object management daemon identifies a task performed on data by an application. The application performing the task has a pre-loaded first locale object containing a first display parameter. The locale object management daemon compares the task to a locale object switch pattern and identifies the locale object switch pattern. The locale object management daemon performs a pre-emptive locale object switch operation. The operation includes identification of a switch reference. The switch reference is compared to the identified task and the comparison is utilized to identify an application performing the task. The locale object management daemon interrupts the execution of the application and over-rides the pre-loaded first locale object. The over-riding of the first locale object includes selecting a second locale object having a second display format parameter based on the identified switch reference. The second locale object is loaded into the interrupted application in real-time. The locale object management daemon resumes execution of the interrupted application and data is formatted based on the second display format parameter.

In another aspect, a computer program product is provided for context-switch based locale object management. The computer program product includes a computer readable storage device with embodied program code that is configured to be executed by a processing unit. More specifically, program code identifies a task performed on data by an application. The application performing the task has a pre-loaded first locale object containing a first display parameter. Program code compares the task to a locale object switch pattern and identifies the locale object switch pattern. The program code performs a pre-emptive locale object switch operation. The operation includes program code to identify a switch reference. The switch reference is compared to the identified task and the comparison is utilized to identify an application performing the task. Program code interrupts execution of the application and over-rides the pre-loaded first locale object. The over-riding of the first locale object includes selecting a second locale object having a second display format parameter based on the identified switch reference. The second locale object is loaded into the interrupted application in real-time. Program code resumes execution of the interrupted application and data is formatted based on the second display format parameter.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
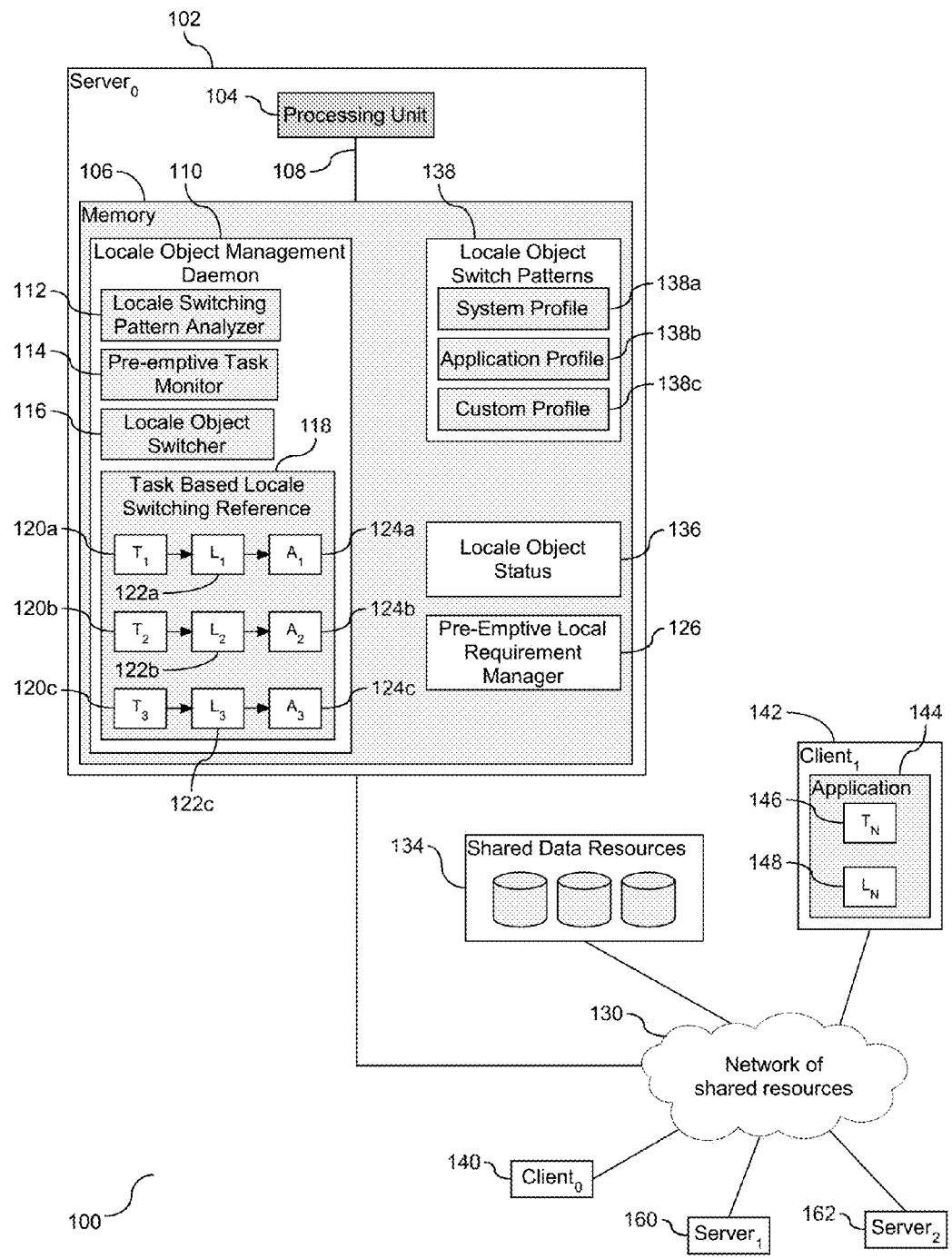
FIG. 1 depicts a block diagram illustrating a computer system in support of context-switch based locale object management.

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

A "locale object" is a set of parameters (locale definitions) that define a display parameter(s) to support the application. When an application begins execution, the application is initially loaded with a locale object. Data is displayed in the application depending on which locale object is loaded into the application. In one embodiment, the locale object includes a language identifier and a region identifier which supports the application to display a cultural convention, also referred to herein as a proper cultural convention. Loading a different locale object may lead to a difference in the display of data.

A system, method and computer program product are disclosed and described herein to provide context-switch based locale object management. As an application is being executed, one or more tasks are performed. A task is referred to herein as a request sent from a client machine to a server, wherein a corresponding application on the server will provide a service based on the request. These tasks are monitored by a local object management daemon. More specifically, the task(s) is monitored in order to determine if it requires globalization. A task requiring globalization is a task associated with a locale object accessing data associated a different locale object. If the task needs to be globalized, a pre-emptive locale object switch operation interrupts the executing application performing the task, and the locale object switch operation re-loads the interrupted application with the different locale object. A locale object may be, but is not limited to, a different locale variant, a different locale version, a different customized locale, or a different locale. The application is then resumed so that the tasks are supported with the re-loaded locale object.

Referring to FIG. 1, a block diagram (100) is provided illustrating a computer system that supports context-switch based locale object management. A server, server$_0$, (102) is shown configured with a processing unit (104) in communication with a memory (106) across a bus (108). Server$_0$ (102) is also shown in communication with a network of shared resources (130) across a network connection to provide access to shared resources, including, but not limited to, shared data resources (134), client machines, client$_0$ (140) and client$_1$ (142), and other servers, server$_1$ (160) and server$_2$ (162).

As shown, client$_0$ (142) is configured to execute a task request, $T_R$ (150). It is understood that executing tasks or task requests generally require data access. In the example shown herein, Client$_1$ (142) executes task request, $T_R$ (150), which is sent to server (102). Server (102) uses a corresponding Application, $A_N$ (144), to service the task request, $T_R$ (150). In order to service the request, application, $A_N$ (144), executes task, $T_N$ (146), that requires access to data which may be stored in a variety of data storage locations, including, but not limited to, shared data resources (134), server$_0$ (102), server$_1$ (160), server$_2$ (162), and client$_0$ (140). As shown, application, $A_N$ (144), is pre-loaded with a locale object, $L_N$ (148), configured with at least one display format parameter. More specifically, the display format parameter is used by the application, $A_N$ (144), when servicing the task request, $T_R$ (150), including when performing task, $T_N$ (146), to retrieve data and send the data to Client$_1$ (142) for displaying the data in the correct format. For example, when application, $A_N$ (144) executes task, $T_N$ (146), which accesses data, the accessed data will be displayed based on one or more parameters associated with the locale object loaded in the application, $L_N$ (148). The data may be graphically presented on a visual display (not shown) in communication with client$_1$ (142). Accordingly, the application accesses and sends data for display based on the local object (148) and at least one associated display format parameter.

Server$_0$ is shown herein with a locale object management daemon (LOMD) (110) which supports a plurality of functions including coordinating globalization, and locale sensitive tasks. As shown, LOMD (110) is stored in memory (106) for execution by processing unit (104). The LOMD (110) analyzes locale object switch patterns (138), tracks and records locale object switching logs, and updates current locale object usage status (136). The LOMD (110) utilizes a plurality of tools to support its functionality, including but not limited to, a locale switching pattern analyzer (LSP analyzer) (112), a pre-emptive task monitor (PT monitor) (114), a locale object switcher (LO switcher) (116), and a task based locale switching reference (TBLS reference) (118). These tools (112)-(118) support the LOMD (110), and more specifically, support and enable coordination of task globalization.

The LSP analyzer (112) is a module that analyzes tasks requiring globalization and any related locale object selection patterns. The LSP analyzer (112) monitors traffic in the network of shared sources (130), determines a locale object selection pattern based on the monitoring of traffic, stores the locale object switch pattern (138) in memory (106), and in one embodiment, stores the locale object switch pattern in shared data resources (134). In one embodiment, a locale object switch pattern stored in shared data resources (134) is updated by overwriting a previously stored locale object switch pattern. In one embodiment, the LSP analyzer (112) determines a locale object switch pattern that when Client, $C_4$, sends a task request to server (102) that uses corresponding Application, $A_1$, and task, $T_1$, the locale object loaded into Application, $A_1$, is locale object, $L_1$, when data is requested from data storage $D_1$. The LSP analyzer (112) stores a locale object switch pattern (138) such as, but not limited to, a system profile (138a), e.g. based on a Client machine, as an application profile (138b), e.g. based on an application requesting or performing the task, and as other application/data traffic custom profile (138c). The locale object switch pattern may be, but is not limited to, any summarized, collected, shared, and modified relations such as references of tasks, client machine profiles, applications, locale names, resource of incoming and outgoing data. Accordingly, the LSP analyzer (112) supports creation of one or more locale object switch pattern(s) in response to a determination of a locale object selection pattern.

The PT monitor (114) is a back end daemon module that monitors tasks requiring globalization across the network of shared resources (130) such as a task request from a client, e.g. client$_0$ (140) or client$_1$ (142), or a task being performed by an application on a server, e.g. server (102). The PT monitor (114) observes tasks, system status, application profiles, and switch patterns. In one embodiment, the tasks, systems, application profiles and switch patterns to observe and priorities of the observation may be pre-defined. The PT monitor (114) collects data and determines if the data matches a locale object switch pattern (138). If a task is determined to match a locale object switch pattern (138), the PT monitor (114) initiates a pre-emptive locale object switch operation according to the matched locale object switch pattern (138). Accordingly, the PT monitor observes tasks, and in one embodiment initiates a pre-emptive locale object switch operation.

After a pre-emptive locale object switch operation is initiated, the LO switcher (116) selects a locale object and loads the selected locale object into a corresponding application. The LO switcher (116) is supported by the TBLS reference (118) in order to provide an appropriate locale object selection and also identify the application that is designated to receive the locale object. The TBLS reference (118) provides a real-time pre-emptive switching reference, e.g. which locale object should be used to complete the task together with identification of the application designated to receive the locale object. For instance, if the task requiring globalization is task, $T_1$ (120a), the LO switcher (116) examines the TBLS reference (118) and determines the appropriate locale object, such as $L_1$ (122a), and the application, $A_1$ (124a), to be re-loaded with the locale object, $L_1$ (122a). In one embodiment, the TBLS reference (118) may include user account information as part of the reference. The TBLS reference (118) may be, but is not limited to, a table, XML format, plain text, binary, or any other data structure. In one embodiment, multiple references may be stored in the TBLS reference (118). For example, task, $T_2$ (120b), corresponds to $L_2$ (122b), and application, $A_2$ (124b), and task, $T_3$ (120c), corresponds to $L_3$ (122c), and application, $A_3$ (124c). $T_1$ (120a), $T_2$ (120b), and $T_3$ (120c) are different tasks, and $T_N$ (146) may be the same task as or a different task than $T_1$ (120a), $T_2$ (120b), or $T_3$ (120c). Additionally, $L_1$ (122a), $L_2$ (122b), $L_3$ (122c), and $L_N$ (148) may be the same or different locale objects, and $A_1$ (124a), $A_2$ (124b), and $A_3$ (124c) may be the same or different applications. Accordingly, the TBLS (118) reference supports the selection and loading of a locale object into an application instituted by the LO switcher (116).

After the LO switcher (116) selects the locale object to load, the LO switcher (116) pre-empts (interrupts) the application associated with TBLS reference (118). The pre-emption interrupts any task associated with the application that is being executed, and in one embodiment executed by processing unit (104). The LO switcher (116) loads the application with the selected locale object. After the selected locale object is loaded, the execution of the application and associated tasks are resumed, and in one embodiment, the execution by processing unit (104) is resumed. Execution of the application resumes at the point where it was interrupted and as such the application does not need to be and is not restarted. Accordingly, the LO switcher (116) supports interruption of application execution, re-loading a locale object, and resuming execution of the application in real-time without the need to re-start execution of a task from the beginning of the task.

As shown herein, a pre-emptive local requirement manager (PLR manager) (126) is configured in memory (106). In one embodiment, the PLR manager (126) is configured on a hypervisor or instance level as a pre-emptive interface for defining and changing locale object switching rules (138). The PLR manager (136) provides a user interface (UI) for defining and changing the locale object switching rules (138). In one embodiment, the PLR manager (136) contains default settings for defining a rule. Accordingly, the PLR manager (136) defines one or more locale object switching rules.

In addition, and as shown herein, a locale object status (136) is stored in memory (106) to support the context-based switch locale object management performed by the LOMD (110). The locale object status (136) keeps a log of executing applications and the locale object loaded with the executing application. The locale object status (136) is checked by the PT monitor (114) when checking a locale object switch pattern (138) to determine if the locale object loaded in an application needs to be changed via a pre-emptive locale object switch operation. The locale object status (136) may be updated when there is a locale object change, such as after completion of a pre-emptive locale object switch operation. The locale object status (136) accommodates multiple sessions of the same application with a shared script and tracks which instance of the application is loaded with a locale object. Accordingly, the locale object status provides information on applications and the locale objects loaded in the applications.

Figure 2:
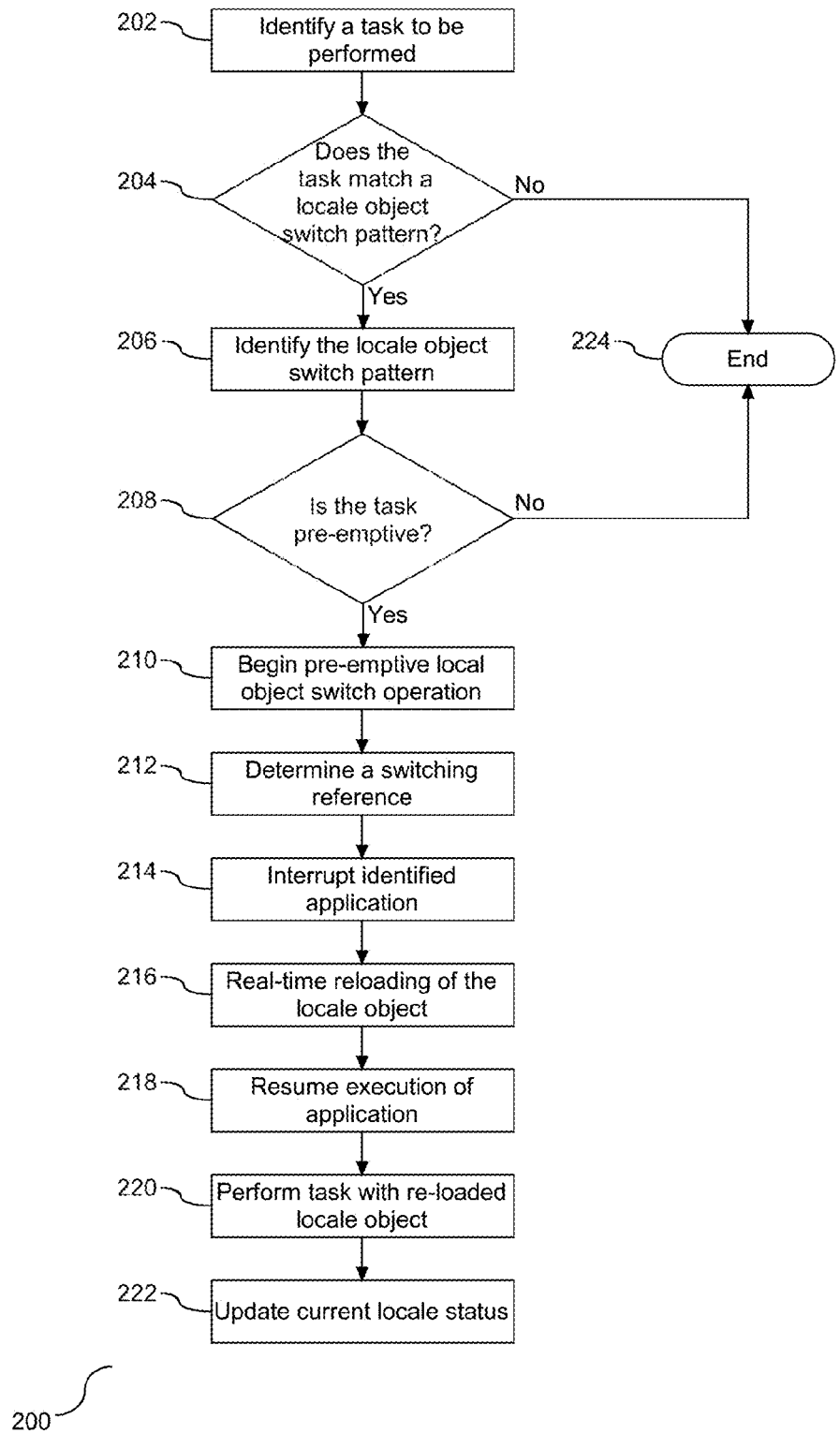
FIG. 2 depicts a flow chart illustrating a process for context-switch based locale object management.

Referring to FIG. 2, a flow chart (200) is provided to illustrate a process for context-switch based locale object management. As shown, the task to be performed on data is identified (202). The identification includes determining a task being performed on a network of shared resources that requires globalization. In one embodiment, the task subject to identification may be filtered by user, system, application, data source, data destination or any other associated characteristic. In one embodiment, the analysis of the task includes comparing the identified task and locale object switch pattern to a locale object status. The analysis of the identified task includes comparing the identified task to a locale object switch pattern and determining if the task matches a locale object switch pattern (204). If the determination at step (204) is positive, e.g. the task matches a pattern, the process proceeds to step (206) and identifies the locale object switch pattern. If the determination at step (204) is negative the process of matching a locale object switch pattern concludes (224) as the response is an indication that the corresponding application is already loaded with the locale object defined in the locale object switch pattern, thus the locale object does not need to be changed and the process concludes (224). Accordingly, a task is identified and, if present, the task is matched to a locale object switch pattern.

As shown, following step (206) the task is subject to further analysis, including a determination as to whether the task is pre-emptible (208). The determination at step (208) includes, but is not limited to, determining if program code indicates the task is pre-emptible or consulting a pre-emptive scheduler, a switching reference, or a user defined rule. The task is considered pre-emptible if the execution of the task by a computer system can be temporarily interrupted without requesting permission from the task, and execution of the interrupted task can resume at a later time at the point where the execution was interrupted. Pre-emption of a task can be carried out by a privileged task or a part of the system, for example, a pre-emptive scheduler or a local object switcher. The pre-emptive scheduler has the power to preempt, or interrupt, and later resume, other tasks in the system. In one embodiment, a priority level is pre-defined for determining an order of task pre-emption. If the response to the determination at step (208) is positive, e.g. the task is pre-emptible, a pre-emptive locale switch operation is performed (210). Otherwise, if the response to the determination at step (208) is negative, the process concludes (224). Accordingly, a pre-emptible task requiring globalization is subject to a pre-emptive locale switch operation.

In order to perform the pre-emptive locale switch operation, a switching reference is determined (212). More specifically, the determination at step (212) includes a comparison of the identified task of step (202) to one or more known switch references and finding a switch reference that matches the identified task of step (202). The switching reference provides a locale object selection and identifies the application that will be re-loaded with the locale object selection. In one embodiment, the switching reference provides secondary information, also referred to herein at metadata such as a client machine, client machine profile, system, data source, data destination or any other information used to determine the optimal locale object and the application to receive the locale object. Execution of the application identified in the switching reference is interrupted (214), e.g. tasks associated with the application being executed by a processor are interrupted. The locale object loaded in the application is re-loaded in real-time with the locale object specified in the switching reference (216). After re-loading of the locale object, execution of the application, and associated tasks, is resumed at the point where the application was interrupted (218). Accordingly, the application is re-loaded with a different locale object based on the switching reference.

The task requiring globalization is performed utilizing the re-loaded locale object (220). The performance of the task includes retrieving data, formatting the data with the second locale object, and displaying the data based on the second locale object. In one embodiment, the formatted data is presented on a visual display. In one embodiment, after completion of the pre-emptive locale object switch operation, the locale object status is updated (222). This update includes changing an association between an application and a locale object. Accordingly, the task is globalized utilizing context-switch based management of locale objects, with the task performance taking place following the globalization.

Figure 3:
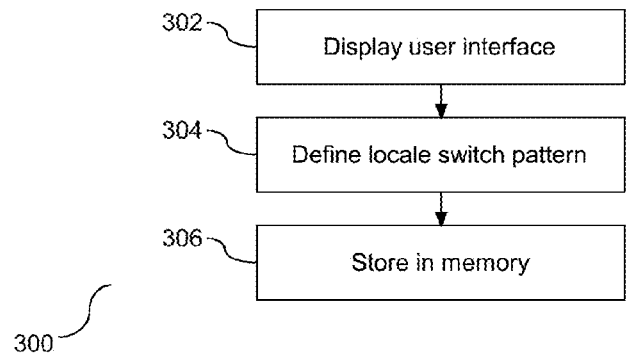
FIG. 3 depicts a flow chart illustrating a process for defining a locale object switch pattern.

The locale object switch pattern may be defined by a client machine. Referring to FIG. 3 a flow chart (300) is provided illustrating an embodiment of defining a locale object switch pattern. A user interface (UI) is displayed on a client machine (302). The UI is used by the client machine to define a locale object switch pattern (304). The definition of the local object switch pattern may include, but is not limited to, relations between applications, a client machine, client machine profile, a system, a task, a locale object, a data source, a data destination, and other parameters. In one embodiment, the UI includes default settings, which can be modified. The locale object switch pattern is stored in memory (306). Accordingly, the locale object switch pattern may be subject to modification.

Figure 4:
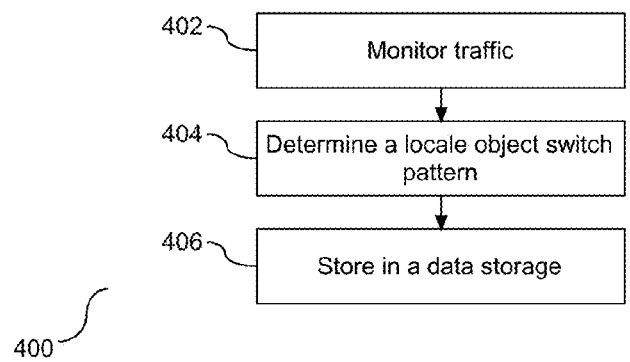
FIG. 4 depicts a flow chart illustrating a process for analyzing and determining a locale object switch pattern.

Referring to FIG. 4, a flow chart (400) is provided illustrating a process for analyzing a locale switch pattern, including use of an analyzer (LSP analyzer) and associated functionality for determining a locale object switch pattern. The LSP analyzer monitors traffic in a network of shared resources (402). The LSP analyzer determines a locale object switch pattern (404). The LSP analyzer stores the determined locale object switch pattern in memory (406) and in one embodiment, stores the locale object switch pattern in shared data resources. In one embodiment, the LSP analyzer updates a locale object switch pattern stored in shared data resources, including overwriting a previously stored locale object switch pattern. In one embodiment, a new locale object switch pattern may be sent as a recommendation to a cloud node, a server or any other device. Accordingly, the LSP analyzer can automatically create a locale object switch pattern.

Figure 5:
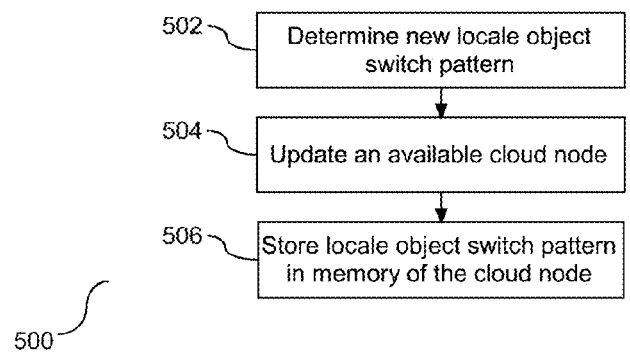
FIG. 5 depicts a flow chart illustrating a process for real-time locale object switch pattern sharing and recommending.

A locale object switch pattern may be shared through a cloud based environment. Referring to FIG. 5, a flow chart (500) is provided illustrating a cloud-based real-time locale object switch pattern sharing and recommendation process. A new locale object switch pattern is detected (502). In one embodiment, a new locale object switch pattern is detected by examining a locale object switch pattern on a second cloud node. In one embodiment, the detection of a new locale object switch pattern includes receiving a recommendation of a new locale object switch pattern. A cloud node containing a locale object switch pattern is updated with the new locale object switch pattern (504). The update includes storing the local object switch pattern in the memory of the cloud node (506). In one embodiment, the update includes overwriting a locale object switch pattern with the new locale object switch pattern. In one embodiment, shared data resources contains locale object switch patterns from different cloud nodes wherein each cloud node can access the shared data resources to determine availability of a new locale object switch pattern. Accordingly, one or more cloud based nodes, also referred to herein as servers, can be updated based on a new locale object switch pattern.

Aspects of context-switch based locale object management shown and described in FIGS. 1-5, employ one or more functional tools. Aspects of the functional tool, e.g. local object management daemon (LOMD), and its associated functionality may be embodied in a computer system/server in a single location, or in one embodiment, may be configured in a cloud based system sharing computing resources. With references to FIG. 6, a block diagram (600) is provided illustrating an example of a computer system/server (602), hereinafter referred to as a host (602) in communication with a cloud based support system, to implement the processes described above with respect to FIGS. 1-5. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments where tasks are performed by remote processing devices that are linked through a communications network. In a distributed cloud computing environment, program modules may be located in both local and remote computer system storage media including memory storage devices.

Figure 6:
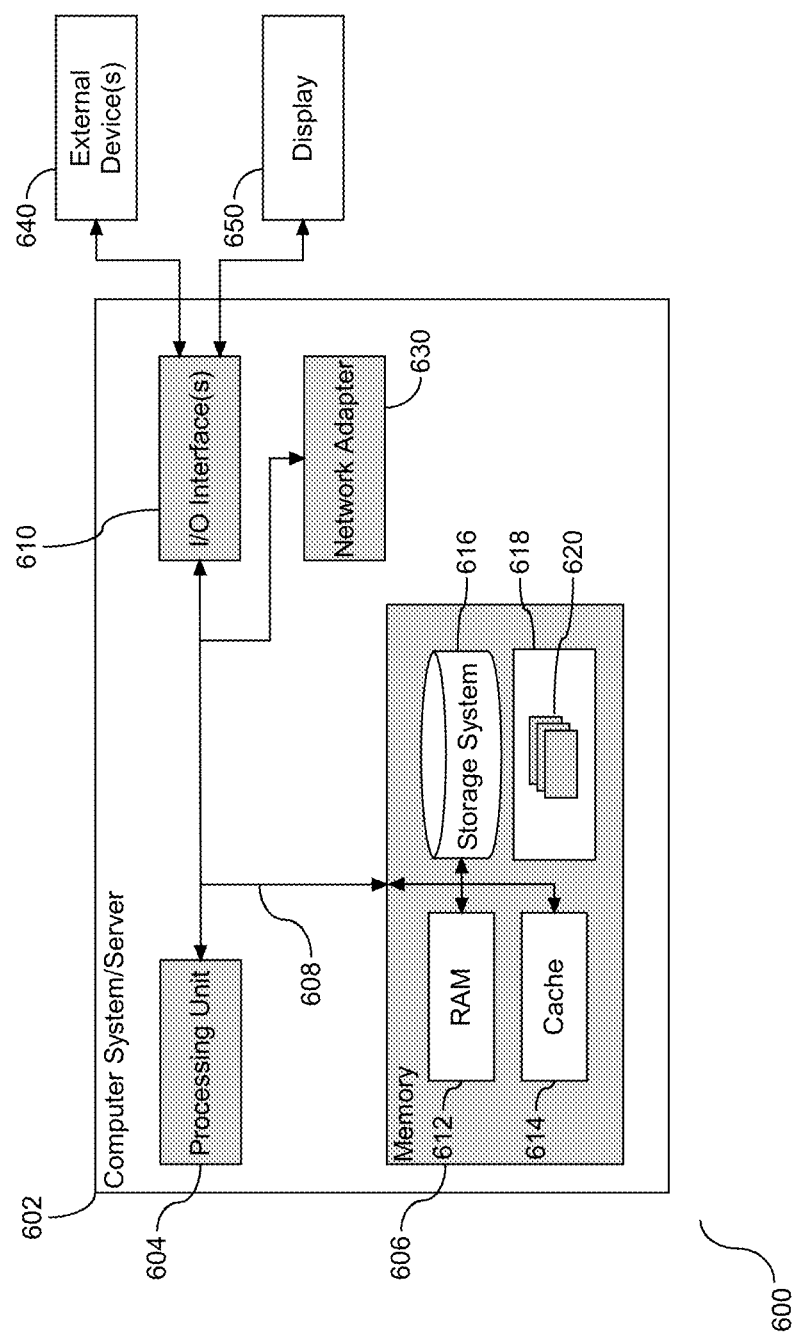
FIG. 6 is a block diagram illustrating an example of a computer system/server of a cloud based support system, to implement the system and process described with respect to FIGS. 1-5.

As shown in FIG. 6, host (602) is shown in the form of a general-purpose computing device. The components of host (602) may include, but are not limited to, one or more processors or processing units (604), a system memory (606), and a bus (608) that couples various system components including system memory (606) to processor (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602) and it includes both volatile and non-volatile media, removable and non-removable media.

Memory (606) can include computer system readable media in the form of volatile memory, such as random access memory (RAM) (672) and/or cache memory (674). By way of example only, storage system (676) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (678), having a set (at least one) of program modules (680), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (680) generally carry out the functions and/or methodologies of embodiments to store and analyze data. For example, the set of program modules (680) may include the modules configured as a locale object management daemon in order to perform context-switch based locale object management described in FIGS. 1-5.

Host (602) may also communicate with one or more external devices (682), such as a keyboard, a pointing device, etc.; a display (684); one or more devices that enable a user to interact with host (602); and/or any devices (e.g., network card, modem, etc.) that enable host (602) to communicate with one or more other computing devices. Such communication can occur via Input/Output (I/O) interface(s) (686). Still yet, host (602) can communicate with one or more networks such as a local area network (LAN), a general wide area network (WAN), and/or a public network (e.g., the Internet) via network adapter (688). As depicted, network adapter (688) communicates with the other components of host (602) via bus (608). In one embodiment, a plurality of nodes of a distributed file system (not shown) is in communication with the host (602) via the I/O interface (686) or via the network adapter (688). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (606), including RAM (672), cache (674), and storage system (676), such as a removable storage drive and a hard disk installed in a hard disk drive.

Computer programs (also called computer control logic) are stored in memory (606). Computer programs may also be received via a communication interface, such as network adapter (688). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

The present embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

In one embodiment, host (602) is a node (690) of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
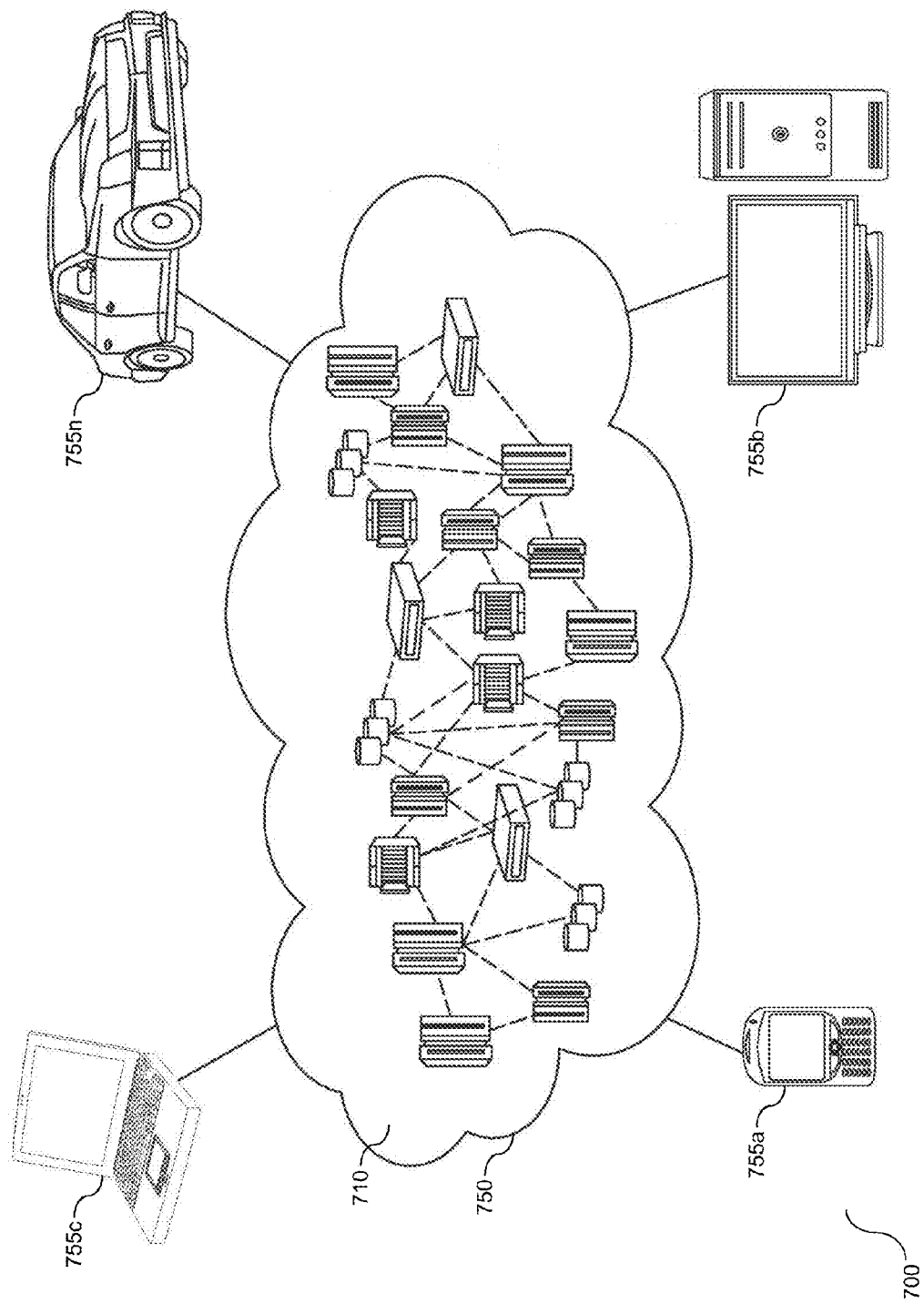
FIG. 7 depicts a block diagram illustrating a cloud computer environment.

Referring now to FIG. 7, an illustrative cloud computing network (700). As shown, cloud computing network (700) includes a cloud computing environment (750) having one or more cloud computing nodes (710) with which local computing devices used by cloud consumers may communicate. Examples of these local computing devices include, but are not limited to, personal digital assistant (PDA) or cellular telephone (755A), desktop computer (755B), laptop computer (755C), and/or automobile computer system (755N). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (755A-N) shown in FIG. 7 are intended to be illustrative only and that the cloud computing environment (750) can communicate with any type of computerized device over any type of network and/or network addressable connection (e.g., using a web browser).

Figure 8:
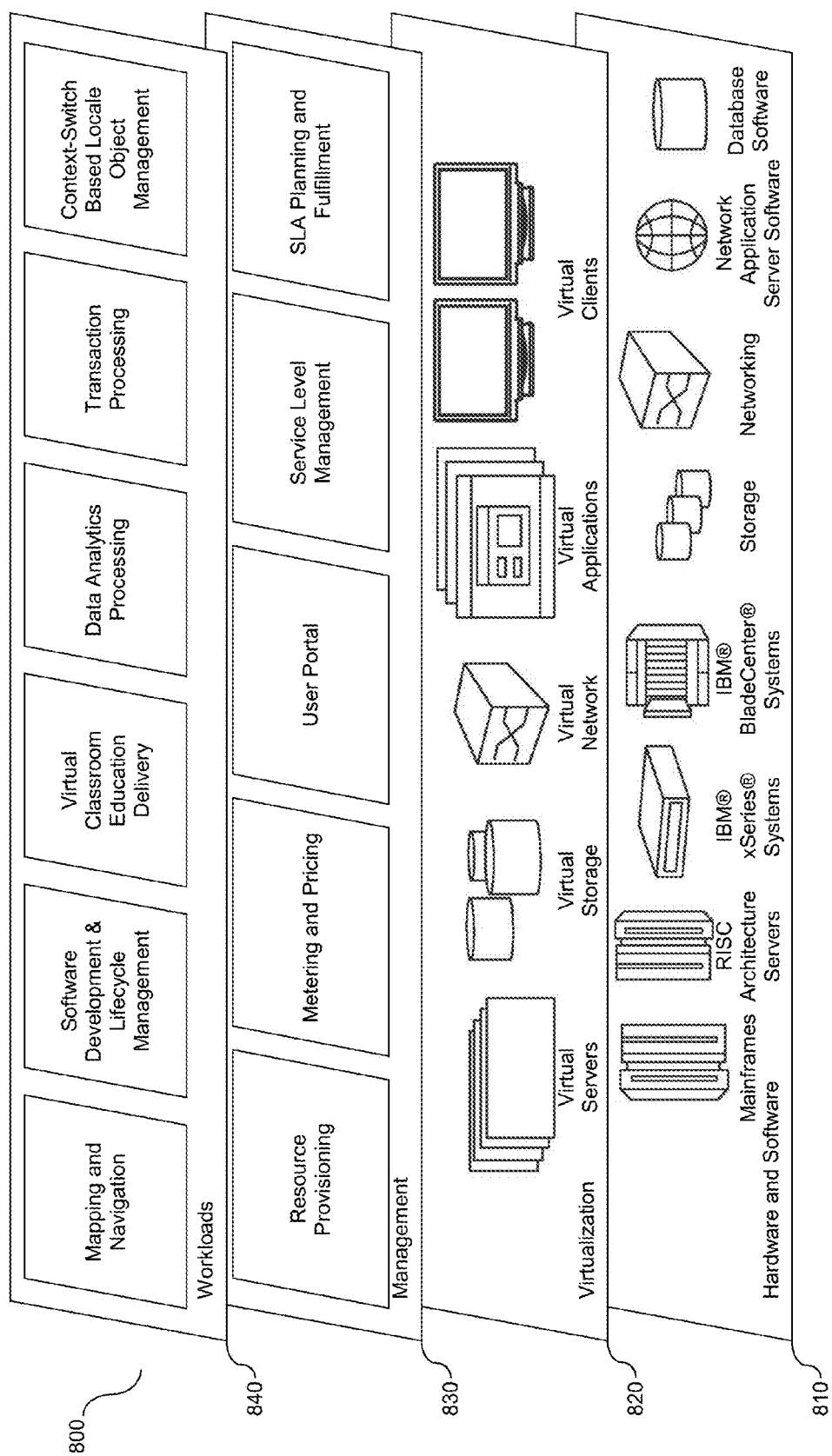
FIG. 8 depicts a block diagram illustrating a set of functional abstraction model layers provided by the cloud computing environment.

Referring now to FIG. 8, a set of functional abstraction layers provided by the cloud computing network of FIG. 6 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840). The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service level management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and context-switch based locale object management.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single dataset, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The corresponding structures, materials, acts, and equivalents of all means or step plus function elements in the claims below are intended to include any structure, material, or act for performing the function in combination with other claimed elements as specifically claimed. The description of the present embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Context-switch based locale object management saves computational power, e.g. processing time, since an entire thread or process does not need to be saved and a task restarted from the beginning. Accordingly, the implementation of context-switch based locale object management saves computational power, e.g. CPU processing time.

It will be appreciated that, although specific embodiments have been described herein for purposes of illustration, various modifications may be made without departing from the spirit and scope of the embodiments. In particular, the type of information stored in the local object switch pattern can include other identifiers which relate to determining a globalization requirement such as, but not limited to, country, time zone, and hemisphere. In one embodiment, the tools of the locale object management daemon may be stored on different servers or client machines. Similarly, in one embodiment, a task requiring globalization can be performed by an application on a server. Accordingly, the scope of protection of these embodiments is limited only by the following claims and their equivalents.

What is claimed is:

1. A computer system comprising:
a processor in communication with a memory;
a functional unit in communication with the processor having a locale object management daemon to perform context-switch based locale object management, the locale object management daemon to:
identify a task being performed on data by an application, the application having a pre-loaded first locale object, wherein the first locale object contains at least one first display format parameter;
perform a first comparison including compare the identified task to a locale object switch pattern;
identify the locale object switch pattern based on the first comparison;
perform a pre-emptive locale object switch operation comprising:
identify a switch reference;
perform a second comparison including compare the identified task to the identified switch reference;
identify the application performing the identified task based on the second comparison;
interrupt execution of the identified application;
over-ride the pre-loaded first locale object including:
select a second locale object based on the identified switch reference, wherein the second locale object contains at least one second display format parameter; and
load, in real-time, the second locale object into the interrupted application; and
resume execution of the interrupted application with the second locale object, including formatting the data based on the second display format parameter.

2. The system of claim 1, further comprising the local object management daemon to:
reference a stored parameter associated with the identified application, wherein the stored parameter defines the identified application as pre-loaded with the first locale object.

3. The system of claim 2, further comprising the local object management daemon to:
update the stored parameter including define the identified application as pre-loaded with the second locale object.

4. The system of claim 1, wherein the locale object switch pattern is pre-defined.

5. The system of claim 1, further comprising a local switching pattern analyzer to:
create the locale object switch pattern, including:
analyze a second executing application having the second locale object performing the identified task;
define the locale object switch pattern of utilizing the second locale object during performance of the identified task; and
store the locale object switch pattern in a first memory location.

6. The system of claim 1, further comprising a local switching pattern analyzer to:
update the locale object switch pattern, including;
detect a new locale object switch pattern;
retrieve the new locale object switch pattern; and
store the new locale object switch pattern in a first memory location.

7. The system of claim 6, wherein detection of a new locale object switch pattern includes receipt of a recommendation of a new locale object switch pattern in real-time.

8. A computer program product for context-switch based locale object management, the computer program product comprising a computer readable storage device having program code embodied therewith, the program code executable by a processor to:
identify a task being performed on data by an application, the application having a pre-loaded first locale object, wherein the first locale object contains at least one first display format parameter;
perform a first comparison including compare the identified task to a locale object switch pattern;
identify the locale object switch pattern based on the first comparison;
perform a pre-emptive locale object switch operation comprising:
identify a switch reference;
perform a second comparison including compare the identified task to the identified switch reference;
identify the application performing the identified task based on the second comparison;
interrupt execution of the identified application;
over-ride the pre-loaded first locale object including:
select a second locale object based on the identified switch reference, wherein the second locale object contains at least one second display format parameter; and
load, in real-time, the second locale object into the interrupted application; and
resume execution of the interrupted application with the second locale object, including formatting the data based on the second display format parameter.

9. The computer program product of claim 8, further comprising program code to:
reference a stored parameter associated with the identified application, wherein the stored parameter defines the identified application as pre-loaded with the first locale object.

10. The computer program product of claim 9, further comprising program code to;
update the stored parameter including define the identified application as pre-loaded with the second locale object.

11. The computer program product of claim 8, wherein the locale object switch pattern is pre-defined.

12. The computer program product of claim 8, further comprising program code to:
create the locale object switch pattern, including:
analyze a second executing application having the second locale object performing the identified task;
define the locale object switch pattern of utilizing the second locale object during performance of the identified task; and
store the locale object switch pattern in a first memory location.

13. The computer program product of claim 8, further comprising program code to:
update the locale object switch pattern, including;
detect a new locale object switch pattern;

retrieve the new locale object switch pattern; and
store the new locale object switch pattern in a first memory location.

* * * * *